United States Patent [19]

Muzzey

[11] Patent Number: 4,627,382
[45] Date of Patent: Dec. 9, 1986

[54] DISPOSABLE LITTER BOX

[76] Inventor: Dennis K. Muzzey, 16402 Jacquie Ave., Lockport, Ill. 60441

[21] Appl. No.: 646,783

[22] Filed: Sep. 4, 1984

[51] Int. Cl.$^4$ ............................................. A01K 23/00
[52] U.S. Cl. ............................................................ 119/1
[58] Field of Search ................... 119/1; 206/604, 605, 206/611, 628, 45.31

[56] References Cited

U.S. PATENT DOCUMENTS 4,171,680 10/1979 Silver et al. .............................. 119/1
4,271,787 6/1981 Wellman et al. ......................... 119/1

Primary Examiner—Hugh R. Chamblee
Attorney, Agent, or Firm—Richard L. Miller

[57] ABSTRACT

A disposable litter box, "Kitty Pal", which is simple and inexpensive to fabricate. Unlike existing disposable kitty litter boxes it is made with one-piece construction. The kitty litter box is made of plastic or wax coated cardboard for moistureproofing. Finger sized semi-circular perforations are provided for easy removal of the top lid which serves a dual function. Besides acting as a top lid, the lid is coated on one side only so that it may be placed, absorptive side up, under the cat litter, thereby acting as an absorbant bottom liner. Since the top side of the lid is uncoated, it may be easily imprinted.

1 Claim, 4 Drawing Figures

DISPOSABLE LITTER BOX

BACKGROUND OF THE INVENTION

The present invention relates generally to the field of animal waste containers and, more specifically, to disposable animal waste containers which are inexpensive to fabricate and easy to use.

There is a clear need for such a container since replacing cat litter, for example, is messy and malodorous and recent medical reports indicate that changing cat litter is particularly contraindicated for pregnant women.

A number of attempts have been made to provide such disposable animal waste containers but all suffer from major inadequacies. Silver et. al. (U.S. Pat. No. 4,171,680) provides a packaged disposable animal waste container which is both complicated and expensive to fabricate since it contains a large number of discrete parts. Likewise, Wellman et. al. (U.S. Pat. No. 4,271,787) provides a disposable container, with litter for animals, which suffers from a large number of component parts. S. Prucha (U.S. Pat. No. 3,745,975) provides a disposable pet relief structure in which the cover is not used as part of the litter box once the cover is removed and which requires a large number of fabrication steps. For a disposable litter box to be truly utilitarian its cost must be only slightly higher than the cost of litter in non-utilitarian containers such as plastic bags or paper sacks.

SUMMARY OF THE INVENTION

It is therefore a primary object of the present invention to provide a disposable litter box (henceforth referred to as "Kitty Pal") which is simple and inexpensive to fabricate.

A further object of the present invention is to provide a "Kitty Pal" disposable litter box in which all parts, even a removable top lid, are used as part of the litter box structure.

A yet further object of the present invention is to provide a "Kitty Pal" disposable litter box with a dual purpose removable lid which protects the absorbant granular material prior to use and then serves as a bottom liner when the litter box is in use.

A yet further object of the present invention is to provide a "Kitty Pal" disposable litter box which is moistureproof so as to prevent the ingress of moisture prior to use and to prevent the egress of animal wastes during use.

A yet further object of the present invention is to provide a "Kitty Pal" disposable litter box with an easy to remove lid wherein a users fingers are inserted into semi-circular slots in the top cover.

A still further object of the present invention is to provide a "Kitty Pal" disposable litter box with an overlapping structure which prevents litter from escaping when an animal claws on the litter.

A yet still further object of the present invention is to provide a "Kitty Pal" disposable litter box upon which an advertising message or instructions for use may be easily imprinted.

Further objects of the present invention will appear as the description proceeds.

To the accomplishment of the above and related objects, this invention may be embodied in the form illustrated in the accompanying drawings, attention being called to the fact, however, that the drawings are only illustrative and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
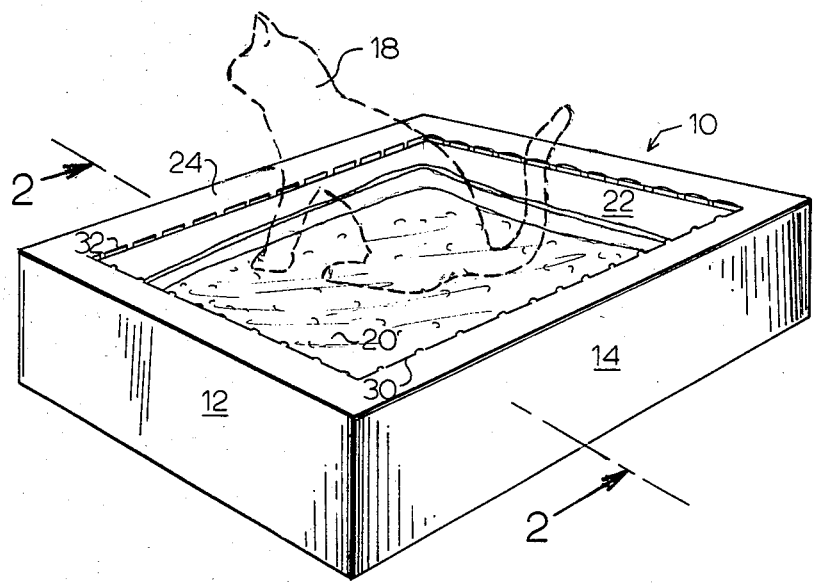
FIG. 1 is a perspective view of the present invention in use.

As can be seen in FIG. 1, a disposable litter box 10, is in the form of a rectangular cardboard box with sides 12 and 14. In FIG. 1 a top lid, which is represented by numeral 16 in FIG. 2, has been completely removed and a cat, numeral 18 shown in phantom, is seen sitting upon granular cat liter 20, which is shown inside an optional plastic liner 22. With or without the liner 22, an overhang portion 24 is provided to prevent the litter 20 from being expelled from the disposable litter box 10 when the cat 18 begins to claw the litter 20.

Figure 4:
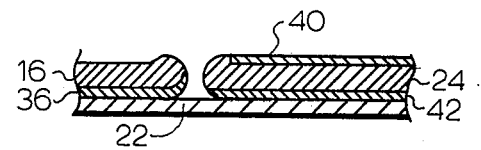
FIG. 4 is a partial cross sectional view taken along line 4—4 of FIG. 3.
Figure 2:
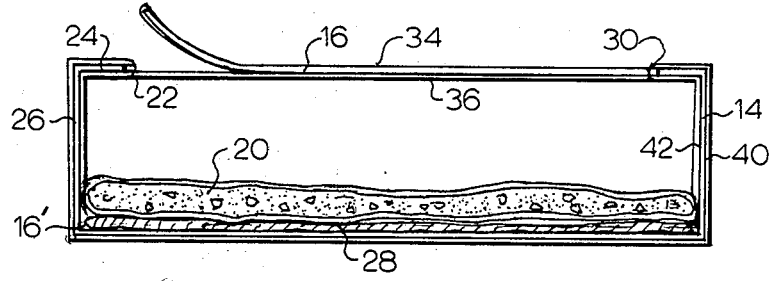
FIG. 2 is a cross sectional view taken along line 2—2 of FIG. 1.
Figure 3:
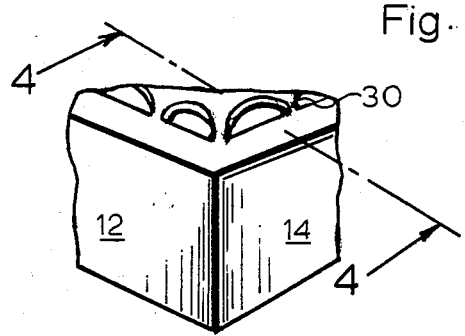
FIG. 3 is an enlarged perspective view of a corner of the invention according to FIG. 1 and illustrating further construction details.

Removal and reuse of the top lid 16 may best be understood with reference to FIGS. 2, 3 and 4. First, four sides represented by 12, 14 and 26, the bottom 28, and the overhang 24 are coated on both sides with either wax or a plastic upper layer 40 or lower layer 42 such as those that are used on disposable milk and beverage containers. Because this makes the structure moistureproof, any parts of the cardboard in the moistureproofed areas that are to be pre-printed, must be pre-printed before moistureproofing. Semi-circular perforations 30 and 32 allow a user to insert one or more fingers and pull away and separate the top lid 16 from the rest of the disposable litter box 10. The top lid 16 is uncoated on its top surface 34 and is coated on its bottom surface 36. This allows the top lid 16 to be used, the absorbant uncoated side 34 facing upwards, as a bottom liner 16' by sliding it under the absorbant granular cat litter 20. The uncoated top surface 34 may also be used to imprint a message even after fabrication of the disposable litter box 10. By providing the large closely spaced perforations 30 and 32, and since the inner surfaces of the perforations 30 and are moistureproofed, when the top lid 16 is removed the integrity of the waterproofing of the remainder of the disposable litter box 10 is largely unaffected. The only place moisture can ingress is at the boundary where small bits of paper are torn away. Alternatively, the top lid 16 can be discarded and a separate absorptive bottom liner, such as those on the bottoms of meat packages, can be used in place of the bottom liner 16'.

While certain novel features of this invention have been shown and described and are pointed out in the appended claims, it will be understood that various omissions, substitutions and changes in the forms and details of the device illustrated and in its operation can be made by those skilled in the art without departing from the spirit of the invention.

What is claimed is:

1. A storable and shippable disposable litter box for cat wastes, comprising:

a box fillable with cat litter;

a flat top lid removably mounted on said box, containing a plurality of perforations and reusable as an absorbant bottom liner for the cat litter, means for moisture proofing, the exterior of said box so that moisture does not ingress during storage and shipment and the cat wastes do not egress after use, wherein said top lid has a top surface that is uncoated and a bottom surface which is moisture proofed so that before said top lid is removed the disposable litter box is moisture proofed and the uncoated top surface can be used for imprinting for the box and when the disposable litter box is used said top lid is placed uninverted with said uncoated top surface facing upwardly, under the cat litter, so as to act as an absorbant bottom liner, and wherein said perforations are semi-circular in shape and contain inwardly facing arcs and straight line edges, said edges and arcs being moisture proofed, so that one or more user fingers can be inserted for removing said top lid, wherein said semi-circular perforations being closely spaced so that when said top lid is removed, the surface area of said box not moisture proofed is minimized.

* * * * *